United States Patent
Honda

(10) Patent No.: US 9,482,162 B2
(45) Date of Patent: Nov. 1, 2016

(54) CONTROLLER AND CONTROL METHOD FOR HOMOGENEOUS CHARGE COMPRESSION IGNITION ENGINE

(71) Applicant: MITSUBISHI ELECTRIC CORPORATION, Chiyoda-ku, Tokyo (JP)

(72) Inventor: Tetsuya Honda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 695 days.

(21) Appl. No.: 13/784,007

(22) Filed: Mar. 4, 2013

(65) Prior Publication Data
US 2013/0239934 A1    Sep. 19, 2013

(30) Foreign Application Priority Data

Mar. 13, 2012   (JP) .................................. 2012-055366

(51) Int. Cl.
| | |
|---|---|
| F02D 41/00 | (2006.01) |
| F02D 41/24 | (2006.01) |
| F02D 35/02 | (2006.01) |
| F02D 13/02 | (2006.01) |
| F02B 1/12 | (2006.01) |

(52) U.S. Cl.
CPC ........... *F02D 41/00* (2013.01); *F02D 13/0215* (2013.01); *F02D 35/021* (2013.01); *F02D 35/028* (2013.01); *F02D 41/006* (2013.01); *F02D 41/2451* (2013.01); *F02B 1/12* (2013.01); *F02D 41/0025* (2013.01); *F02D 2041/001* (2013.01); *Y02T 10/128* (2013.01); *Y02T 10/18* (2013.01); *Y02T 10/47* (2013.01)

(58) Field of Classification Search
CPC ..................... F02D 2041/001; F02D 13/0215; F02D 35/028; F02D 35/021; F02D 41/00; F02D 41/006; F02D 41/2451; F02D 41/0025; F02B 1/12; Y02T 10/128; Y02T 10/18; Y02T 10/47
See application file for complete search history.

(56) References Cited

U.S. PATENT DOCUMENTS

2010/0057324 A1\*   3/2010   Glugla ................. F02D 35/021
                                                                701/102

(Continued)

FOREIGN PATENT DOCUMENTS

| | | |
|---|---|---|
| JP | 4086602 B2 | 2/2008 |
| JP | 2008-291717 A | 12/2008 |

*Primary Examiner* — Sizo Vilakazi
(74) *Attorney, Agent, or Firm* — Sughrue Mion, PLLC; Richard C Turner

(57) ABSTRACT

Provided are a controller and a control method for a homogeneous charge compression ignition engine, which are capable of obtaining a highly efficient and stable combustion state over a wide range of load condition. A correction factor computing section executes combustion control with an excess air ratio smaller than approximately 3 when a predetermined condition is satisfied and computes a correction factor for correcting deviations between execution values of valve-opening timings and valve-opening periods of an intake valve and an exhaust valve and basic valve-opening timings and basic valve-opening periods of the intake valve and the exhaust valve which are previously determined for each operation condition, based on a timing at which an ion current becomes maximum detected by a combustion-timing detection section, in the combustion control with the excess air ratio smaller than approximately 3.

14 Claims, 6 Drawing Sheets

(56) References Cited

U.S. PATENT DOCUMENTS

2010/0154509 A1* 6/2010 Asano ............... F02D 35/021 73/23.32

2010/0185381 A1* 7/2010 VanDyne ............ F02D 35/021 701/105

2012/0271533 A1* 10/2012 Shishime ............ F02D 35/021 701/105

* cited by examiner

CONTROLLER AND CONTROL METHOD FOR HOMOGENEOUS CHARGE COMPRESSION IGNITION ENGINE

BACKGROUND OF THE INVENTION

1. Field of the Invention

The present invention relates to a controller and a control method for a homogeneous charge compression ignition engine which causes an air-fuel mixture formed in a combustion chamber to self-ignite by a compression of a piston under at least a part of operation conditions.

2. Description of the Related Art

In a homogeneous charge compression ignition engine, an air-fuel mixture formed by the mixture of air and fuel in a combustion chamber reaches a self-ignition temperature by the compression of a piston to simultaneously start combustions at a plurality of positions in a space inside the combustion chamber. Specifically, a electric spark (electric discharge), which is used for ignition in a conventional gasoline internal combustion engine, is not required in the homogeneous charge compression ignition engine.

A rise in temperature of the air-fuel mixture by the compression of the piston is brought about by an adiabatic compression action. Therefore, in order to obtain a greater adiabatic compression action so as to allow the temperature of the air-fuel mixture to reach the self-ignition temperature, a compression ratio is generally set higher in the homogeneous charge compression ignition engine than in a conventional spark-ignition internal combustion engine.

The self-ignition temperature of gasoline is about 300° C. although slightly different depending on a pressure and a mixture concentration. It is difficult to increase the temperature of the mixture containing a large amount of air at room temperature to about 300° C. only by the adiabatic compression action. Accordingly, it is necessary to increase the temperature of the mixture to be higher than that in the case of the conventional gasoline internal combustion engine by using means for causing a part of a combustion gas at a high temperature to remain in the combustion chamber.

As the means for causing a part of the combustion gas at a high temperature to remain in the combustion chamber, there is known a controller for an engine, for changing an internal exhaust gas recirculation (EGR) amount by changing at least one of valve-opening timings and valve-opening periods of an intake valve and an exhaust valve (for example, see Japanese Patent No. 4086602).

Specifically, for example, by adjusting a timing of closing the exhaust valve to the advance side, the amount of a high-temperature combustion gas, which is not discharged from the combustion chamber, increases. Therefore, the temperature of the mixture in the combustion chamber in the next cycle can be increased to be high.

The increase in temperature of the air-fuel mixture itself is relatively easily realized in the above-mentioned manner. However, if the temperature of the mixture becomes higher than needed, a combustion speed increases to cause combustion with vibrations similar to knocking. On the other hand, if the temperature of the mixture becomes lower than needed, the ignition becomes unstable to cause an accidental fire. Therefore, the temperature of the air-fuel mixture is required to be always controlled to be a proper temperature.

Moreover, in the conventional gasoline internal combustion engine, the air-fuel mixture is forcibly ignited by the electric spark (electric discharge). Therefore, in the case of common commercially-available gasoline, the air-fuel mixture can be combusted with little affected by a variation in composition of elements. On the other hand, in the homogeneous charge compression ignition engine without the electric spark (electric discharge), even in the case of the common commercially-available gasoline, the self-ignition temperature or the like changes depending on a difference in composition of elements, which is generated between different seasons, regions where crude oil is extracted, oil factories and the like. As a result, the temperature of the air-fuel mixture, which is suitable for the combustion, differs.

In order to cope with the above-mentioned problem, Japanese Patent No. 4086602 cited above describes a technology for controlling the temperature of the air-fuel mixture to a temperature suitable for the combustion with the current composition of elements of gasoline, based on the result of detection of a combustion timing or the like, specifically, for example, a measured value of a pressure in the combustion chamber.

Moreover, at the time of combustion of the air-fuel mixture in each cylinder, a crank angle (combustion timing) at which a heat generation rate (generated heat amount for each unit crank angle) becomes maximum, and a crank angle at which an ion current becomes maximum have a strong correlation. Based on the above-mentioned fact, a technology for controlling the temperature of the air-fuel mixture based on the ion current is known (for example, see Japanese Patent Application Laid-open No. 2008-291717).

However, the conventional technologies have the following problem.

The conventional gasoline internal combustion engine with the spark ignition is operated at a stoichiometric mixture (excess air ratio $\lambda=1$) at which a hydrocarbon-based fuel changes into carbon dioxide and water by an oxidation reaction without excess of oxygen, whereas the homogeneous charge compression ignition engine is operated in a super-excess air state at a multiple of the stoichiometric mixture, for example, at the excess air ratio $\lambda=$about 3 to 6.

The above-mentioned operation is performed to obtain a highly efficient combustion state over a wider range of load condition by reducing an intake pumping loss by fully opening a throttle under a low-load condition, and by suppressing a rise in combustion speed, in particular, under a high-load condition.

On the other hand, the ion current is electrons and cation molecules having a positive potential which are generated in the combustion reaction process of the hydrocarbon-based fuel, and negative ions and positive ions generated by thermal dissociation, which are captured by applying a high electric field so as to be detected as a current. Therefore, the detected ion current changes depending on a space density of the electrons and ions present in a space to which the high electric field is applied.

FIG. 6 is an explanatory view showing a change characteristic of a maximum ion current measured by the inventor(s) of the present invention with respect to the excess air ratio $\lambda$. The maximum ion current means a maximum value of the ion current, which is measured during one combustion cycle, and is generally a minute current on the order of microamperes.

In FIG. 6, when the homogeneous charge compression ignition engine is operated in the super-excess air state, for example, at the excess air ratio $\lambda=3$ or larger, the maximum ion current becomes minute to the level of noise of an electric circuit. Therefore, a timing at which the ion current becomes maximum cannot be detected. Therefore, there is a problem in that the temperature of the air-fuel mixture cannot be controlled to a temperature suitable for the combustion based on the ion-current information.

SUMMARY OF THE INVENTION

The present invention has been made to solve the problem described above, and therefore has an object to provide a controller and a control method for a homogeneous charge compression ignition engine, which are capable of a compression self-ignition combustion operation corresponding to a change in combustion state caused by a change in compound composition of a fuel to obtain a highly efficient and stable combustion state over a wide range of load condition, even under an operation condition in a super-excess air state, in which combustion control based on an ion-current measurement realizable by an inexpensive device cannot be implemented.

According to an exemplary embodiment of the present invention, there is provided a controller for a homogeneous charge compression ignition engine allowing a combustion operation of self-igniting, by a compression of a piston, a high-excess air ratio mixture, which being a mixture formed in a combustion chamber and having a mixture ratio of air and fuel of three times or more as large as a stoichiometric mixture ratio (having an excess air ratio of 3 or larger), the controller including: an ion-current detection section for detecting ions generated by combustion in the combustion chamber as an ion current; a combustion-timing detection section for detecting a timing at which the ion current becomes maximum; and a correction factor computing section for executing combustion control with the excess air ratio smaller than approximately 3 when a predetermined condition is satisfied and for computing a correction factor for correcting deviations between execution values of valve-opening timings and valve-opening periods of an intake valve and an exhaust valve and basic valve-opening timings and basic valve-opening periods of the intake valve and the exhaust valve which are previously determined for each operation condition, based on the timing at which the ion current becomes maximum detected by the combustion-timing detection section, in the combustion control with the excess air ratio smaller than approximately 3.

According to another exemplary embodiment of the present invention, there is provided a control method for a homogeneous charge compression ignition engine allowing a combustion operation of self-igniting, by a compression of a piston, a high-excess air ratio mixture, which being a mixture formed in a combustion chamber and having a mixture ratio of air and fuel of three times or more as large as a stoichiometric mixture ratio (having an excess air ratio of 3 or larger), the control method including: an ion-current detection step of detecting ions generated by combustion in the combustion chamber as an ion current; a combustion-timing detection step of detecting a timing at which the ion current becomes maximum; and a correction factor computing step of executing combustion control with the excess air ratio smaller than approximately 3 when a predetermined condition is satisfied and of computing a correction factor for correcting deviations between execution values of valve-opening timings and valve-opening periods of an intake valve and an exhaust valve and basic valve-opening timings and basic valve-opening periods of the intake valve and the exhaust valve which are previously determined for each operation condition, based on the timing at which the ion current becomes maximum detected in the combustion-timing detection step, in the combustion control with the excess air ratio smaller than approximately 3.

According to the controller and the control method for a homogeneous charge compression ignition engine of the present invention, the correction factor computing section (step) executes the combustion control with the excess air ratio smaller than approximately 3 when the predetermined condition is satisfied and computes the correction factor for correcting the deviations between the execution values of the valve-opening timings and the valve-opening periods of the intake valve and the exhaust valve and the basic valve-opening timings and the basic valve-opening periods of the intake valve and the exhaust valve which are previously determined for each operation condition, based on the timing at which the ion current becomes maximum detected by the combustion-timing detection section (step), in the combustion control with the excess air ratio smaller than approximately 3.

Therefore, by controlling at least one of the valve-opening timings and the valve-opening periods of the intake valve and the exhaust valve by using the correction factor in the combustion operation with the excess air ratio equal to or larger than approximately 3, the compression self-ignition combustion operation corresponding to a change in combustion state caused by a change in composition of elements of the fuel or the like is allowed even under the operation condition in a super-excess air state in which the combustion control based on the ion-current measurement realizable by an inexpensive device cannot be implemented. As a result, a highly efficient and stable combustion state can be obtained over a wide range of load condition.

DETAILED DESCRIPTION OF THE PREFERRED EMBODIMENT

Figure 1:
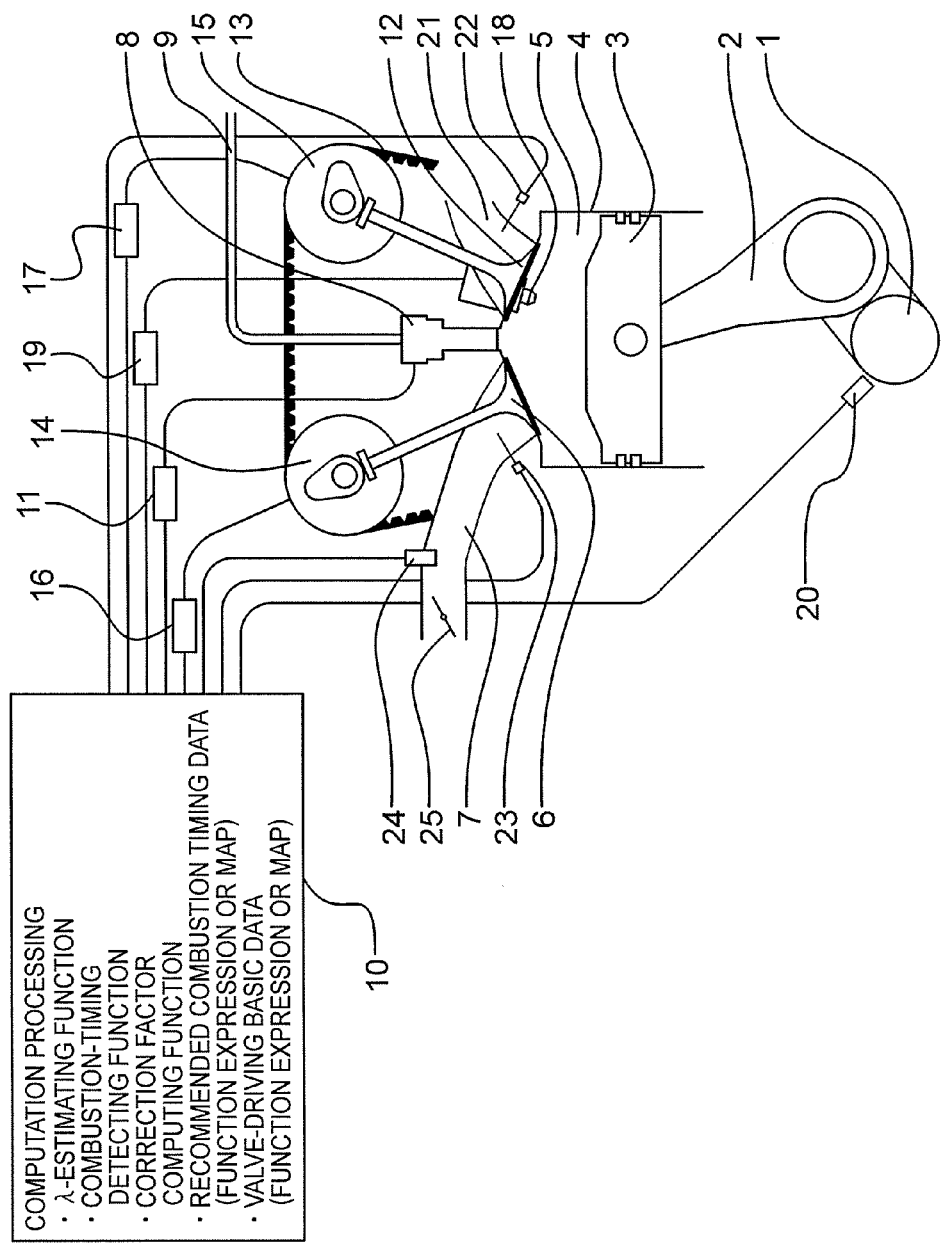
FIG. 1 is a configuration diagram illustrating a homogeneous charge compression ignition engine according to a first embodiment of the present invention.

A controller and a control method for a homogeneous charge compression ignition engine according to an exemplary embodiment of the present invention are hereinafter described referring to the accompanying drawings. In the drawings, the same or corresponding parts are denoted by the same reference numerals for description. The internal combustion engine includes a spark plug so that an air-fuel mixture formed in a combustion chamber may be self-ignited by a compression of a piston under a part of operation conditions.

First Embodiment

FIG. 1 is a configuration diagram of a homogeneous charge compression ignition engine according to a first embodiment of the present invention. Although an internal combustion engine used for driving a vehicle or the like generally includes a plurality of combustion chambers, a configuration of only one of the plurality of combustion chambers is illustrated so as to simplify the description of an operation.

In FIG. 1, the homogeneous charge compression ignition engine includes an output-shaft crank 1, a connecting rod 2, a piston 3, a cylinder 4, a combustion chamber 5, an intake valve 6, an intake manifold 7, a fuel injector 8, a fuel delivery pipe 9, an engine control unit 10, a injector drive control unit 11, an exhaust valve 12, a timing belt 13, an intake-valve driving mechanism 14, an exhaust-valve driving mechanism 15, an intake-valve drive control unit (valve-driving control section) 16, an exhaust-valve drive control unit (valve-driving control section) 17, an electrode 18, anion-current circuit (ion-current detection section) 19, an engine speed sensor 20, an exhaust manifold 21, an exhaust-gas temperature sensor 22, an intake-air temperature sensor 23, an intake-air pressure sensor 24, and a throttle 25.

Next, an operation during each of "intake", "compression", "expansion (combustion)", and "exhaust" strokes in the homogeneous charge compression ignition engine is described. During each of the strokes, the piston 3 performs reciprocating movement along the cylinder 4 by an action of the connecting rod 2 along with the rotation of the output-shaft crank 1. As a result, a volume of the combustion chamber 5 changes.

First, during the intake stroke, the intake valve 6 starts gradually opening in the vicinity of a state in which the piston 3 is most deeply pushed so as to pull out the piston 3. As a result, air is sucked into the combustion chamber 5 through the intake manifold 7. In the homogeneous charge compression ignition engine, the fuel is injected and fed to the combustion chamber 5 by the fuel injector 8 during the intake stroke. The fuel injector 8 may be provided to the intake manifold 7 instead of being provided in the combustion chamber 5.

The fuel is fed through the fuel delivery pipe 9 after being pressurized to about 100 to 200 atmospheres by a fuel boost pump (not shown) or the like. The injection feeding of the fuel is controlled by the reception of control information about an injection amount and an injection timing, which are determined by computation processing performed in the engine control unit 10, by the injector drive control unit 11, and the subsequent supply of driving energy to the fuel injector 8.

Subsequently, during the compression stroke, the intake valve 6 starts gradually closing in the middle of the process of pulling out the piston 3. When the intake valve 6 is fully closed in the vicinity of a position where the push of the piston 3 is started again, air sucked into the combustion chamber 5 and the fuel fed to the combustion chamber 5 are compressed while continuing being mixed.

In the conventional gasoline internal combustion engine in which the combustion is started by the spark ignition, a little before the piston 3 is subsequently most deeply pushed, the combustion of the air-fuel mixture is started by the spark plug or the like. On the other hand, in the homogeneous charge compression ignition engine, the air-fuel mixture is strongly compressed by the piston 3 with an adiabatic compression until the temperature of the air-fuel mixture increases to cause the self-ignition, thereby starting combustion.

Next, when the combustion is started during the expansion stroke, a pressure in the combustion chamber 5 abruptly increases so that a force for pushing back the piston 3 acts. Therefore, a turning force is generated in the output-shaft crank 1 by the connecting rod 2.

Subsequently, during the exhaust stroke, the exhaust valve 12 starts gradually opening in the vicinity of a position at which the piston 3 is most deeply pushed back. As a result, a combustion gas is discharged from the combustion chamber 5.

In the homogeneous charge compression ignition engine, a compression ratio is set higher than that for the internal combustion engine with the normal spark ignition so as to achieve a high temperature of the air-fuel mixture by the adiabatic compression. At this time, in order to control the temperature of the air-fuel mixture to be a proper temperature, control for changing at least one of valve-opening timings and valve-opening periods of the intake valve 6 and the exhaust valve 12 is performed.

Specifically, the intake valve 6 and the exhaust valve 12 are respectively driven by the intake-valve driving mechanism 14 and the exhaust-valve driving mechanism 15 which perform a rotating operation at a half of the rotating speed of the output-shaft crank 1 by the timing belt 13. A mechanism for changing at least one of the valve-opening timing and the valve-opening time period of the intake valve 6 is incorporated into the intake-valve driving mechanism 14. Similarly, a mechanism for changing at least one of the valve-opening timing and the valve-opening time period of the exhaust valve 12 is incorporated into the exhaust-valve driving mechanism 15.

The valve-opening timings and the valve-opening periods of the intake valve 6 and the exhaust valve 12 can be changed by the reception of control information about the valve-opening timings and the valve-opening periods, which are determined by computation processing performed in the engine control unit 10, respectively by the intake-valve drive control unit 16 and the exhaust-valve drive control unit 17 to control the intake-valve driving mechanism 14 and the exhaust-valve driving mechanism 15.

As a fuel used in the case where the homogeneous charge compression ignition engine is used as a driving device for an automobile, commercially-available gasoline is generally used. Although a composition of elements of the commercially-available gasoline is controlled to some extent, the commercially-available gasoline is a mixture of various types of hydrocarbon-based materials . Therefore, the composition of elements varies depending on different seasons, regions where crude oil is extracted, oil factories and the like. Moreover, a plurality of components having different volatility characteristics are mixed. Therefore, a change in composition of elements with elapse of time also occurs.

The above-mentioned differences and changes in composition of elements generate a difference in temperature at which the mixture of air, the fuel, and the combustion gas is self-ignited. Therefore, in order to stably obtain a proper self-ignition timing, the composition of elements itself of the fuel or a combustion state with the fuel is required to be detected so that the temperature of the mixture reaches a self-ignition temperature at a proper timing.

At this time, for example, when the exhaust-valve drive control unit 17 changes the operation of the exhaust-valve driving mechanism 15 to advance the timing at which the exhaust valve 12 is closed, the amount of high-temperature fuel gas remaining in the combustion chamber 5 increases to increase the temperature that the mixture of air, the fuel, and the remaining combustion gas reaches during the subsequent compression stroke. By performing the control for change as described above, the temperature that the mixture reaches can be relatively freely changed.

In order to control the temperature of the mixture to actually reach the self-ignition temperature at a proper timing, the combustion state is required to be detected in the homogeneous charge compression ignition engine. As means for detecting the combustion state, an ion-current characteristic can be used.

Figure 2:
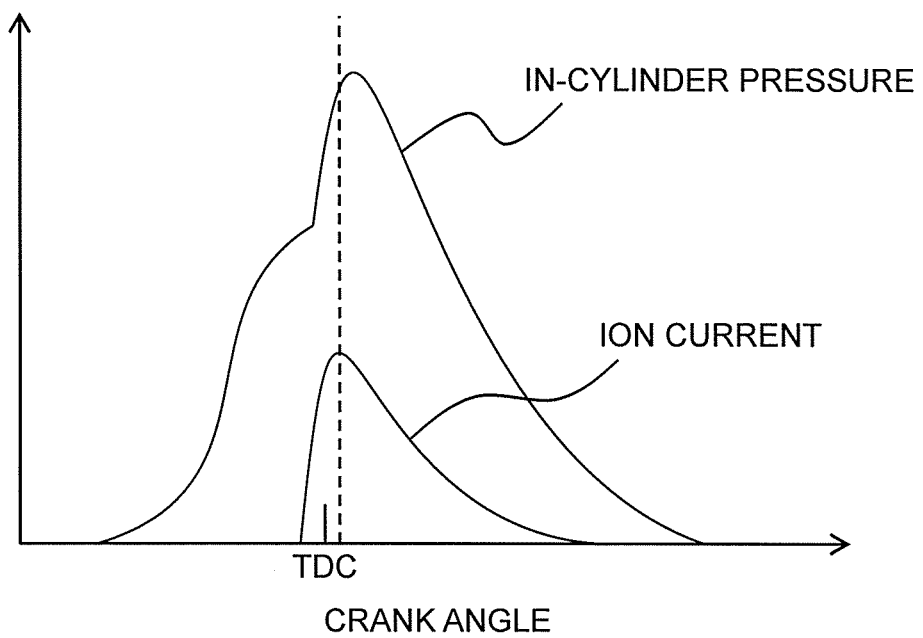
FIG. 2 is an explanatory view showing output patterns of an in-cylinder pressure and an ion current of the homogeneous charge compression ignition engine according to the first embodiment of the present invention.

FIG. 2 is an explanatory view showing output patterns of an in-cylinder pressure and an ion current of the homogeneous charge compression ignition engine according to the first embodiment of the present invention. From FIG. 2, it can be seen that a timing at which the ion current obtained by capturing a combustion intermediate product having positive or negative charges generated in the combustion reaction process of the fuel becomes maximum, and a timing at which the combustion becomes active to maximize the pressure of the combustion chamber 5, are approximately synchronous.

Therefore, by detecting the timing at which the ion current becomes maximum, a timing at which the combustion becomes most active can be substantially obtained. The timing at which the combustion becomes most active is linked to the self-ignition timing. Therefore, in other words, the self-ignition timing can be substantially obtained by detecting the timing at which the ion current becomes maximum.

For the detection described above, the electrode 18 for capturing the ions generated in the combustion reaction process is inserted into the combustion chamber 5 so as to be insulated from the cylinder 4. The ion current is detected by the ion-current circuit 19. The timing at which the ion current becomes maximum, which corresponds to the timing at which the combustion becomes most active, is detected by the ion-current circuit 19 or a combustion-timing detecting function (combustion-timing detection section) provided to the engine control unit 10 which has received the ion-current information.

Further, in the homogeneous charge compression ignition engine, the temperature of the mixture of air, the fuel, and the combustion gas in the final phase of the compression stroke affects the self-ignition timing and the combustion speed. Specifically, as compared with the case where the temperature of the mixture is low, the self-ignition timing is advanced and the combustion speed becomes higher in the case where the temperature of the mixture is high. At this time, if the temperature of the mixture is high and the combustion speed becomes too high, combustion with vibrations similar to knocking occurs, resulting in a fear of damaging an internal combustion engine main body. On the other hand, if the temperature of the mixture becomes too low, the ignition becomes unstable, resulting in a fear of an accidental fire.

Further, similarly to the conventional spark-ignition internal combustion engine, the combustion timing at which a thermal efficiency becomes maximum is present even in the homogeneous charge compression ignition engine. Therefore, is it desired that the self-ignition timing be controlled to be synchronous with the combustion timing as much as possible also in terms of operation of the engine system with high efficiency.

Therefore, in order to operate the homogeneous charge compression ignition engine with high efficiency in a stable manner as described above, the engine control unit 10 stores recommended combustion-timing data in advance as a function expression or a data map having a plurality of pieces of operation-condition information as parameters. The engine control unit 10 outputs control information relating to the valve-opening timings and the valve-opening periods of the intake valve 6 and the exhaust valve 12 respectively to the intake-valve drive control unit 16 and the exhaust-valve drive control unit 17 so that the timing at which the ion current becomes maximum becomes synchronous with the recommended combustion timing.

Specifically, when the timing at which the ion current becomes maximum is advanced with respect to the recommended combustion timing, the engine control unit 10 determines that the temperature of the mixture is required to be lowered, and therefore outputs control information for changing the valve-opening timings and the valve-opening periods of the intake valve 6 and the exhaust valve 12 respectively to the intake-valve drive control unit 16 and the exhaust-valve drive control unit 17 so as to reduce the amount of combustion gas remaining in the combustion chamber 5.

On the other hand, when the timing at which the ion current becomes maximum is retarded with respect to the recommended combustion timing, the engine control unit 10 determines that the temperature of the mixture is required to be increased, and therefore outputs the control information for changing the valve-opening timings and the valve-opening periods of the intake valve 6 and the exhaust valve 12 respectively to the intake-valve drive control unit 16 and the exhaust-valve drive control unit 17 so as to increase the amount of combustion gas remaining in the combustion chamber 5.

The combustion gas which remains in the combustion chamber 5 is a so-called EGR gas. In stoichiometric combustion with an excess air ratio $\lambda$ of 1, the combustion speed is lowered by an increase in the amount of remaining gas. On the other hand, in an excess air state with the excess air ratio $\lambda$ sufficiently larger than 1, a sufficient amount of oxygen is present. Therefore, even if the amount of the remaining gas increases, the combustion speed is not lowered. As a result, the effect of increasing the temperature of the mixture can be obtained.

Here, in the compression self-ignition combustion, under the operating conditions where the ion current is high and the timing at which the ion current becomes maximum can be detected, the valve-opening timings and the valve-opening periods of the intake valve 6 and the exhaust valve 12 are changed so that the timing at which the ion current becomes maximum becomes synchronous with the recommended combustion timing as described above. As a result, the highly efficient and stable combustion state can be obtained.

However, in the compression self-ignition combustion in a super-excess air state with the excess air ratio $\lambda$ equal to or larger than approximately 3, the timing at which the ion current becomes maximum cannot be detected as described above. Therefore, control different from the above-mentioned one is required to be performed.

In order to perform the control for obtaining the highly efficient and stable combustion state even in the super-excess air state with the excess air ratio λ equal to or larger than approximately 3, the engine control unit 10 stores valve-driving basic data in advance corresponding to control information to be output to the intake-valve drive control unit 16 and the exhaust-valve drive control unit 17 as a function expression or a data map having a plurality of pieces of operation-condition information as parameters.

As the valve-driving basic data, a correction factor for changing the valve-opening timings and the valve-opening periods of the intake valve 6 and the exhaust valve 12 in accordance with the composition of elements of the fuel is stored. The correction factor is calculated in the case where the composition of elements of the fuel is considered to be changed, for example, each time after the fuel is supplied to a fuel tank or after elapse of a predetermined time from the previous fuel supply.

In order to calculate the correction factor, the excess air ratio λ which allows the detection of the timing at which the ion current becomes maximum is required to be set smaller than 3 as the operation condition. At this time, the engine control unit 10 extracts deviations between the valve-opening timings and the valve-opening periods of the intake valve 6 and the exhaust valve 12 which are actually controlled so that the timing at which the ion current becomes maximum with respect to the valve-driving basic data becomes synchronous with the recommended combustion timing so as to calculate the correction factor in accordance with the deviations. The above-mentioned function is provided to the engine control unit 10 as a correction factor computing function (correction factor computing section).

The homogeneous charge compression ignition engine is provided with various types of detectors for detecting the operation-condition information relating to the above-mentioned two types of function expressions or data maps. Specifically, the engine speed sensor 20 is provided to a rotating portion of the output-shaft crank 1 or a rotating portion in synchronous with the output-shaft crank 1 so as to detect an rpm of the output-shaft crank 1. The exhaust-gas temperature sensor 22 is provided to the exhaust manifold 21 so as to estimate the temperature of the combustion gas remaining in the combustion chamber 5.

Moreover, besides the intake-air temperature sensor 23, the intake-air pressure sensor 24 is provided to the intake manifold 7. A λ-estimating function provided to the engine control unit 10 calculates an intake air amount to the combustion chamber 5 based on outputs from the engine speed sensor 20, the intake-air temperature sensor 23, and the intake-air pressure sensor 24 and also calculates a fuel injection amount based on fuel injection characteristics of the fuel injector 8 and control information for the injector drive control unit 11 to estimate the excess air ratio λ corresponding to a mixture ratio of air and the fuel.

The throttle 25 for regulating the intake air amount to obtain a desired excess air ratio λ is provided to an end of the intake manifold 7. The operation condition corresponding to the excess air ratio λ smaller than 3 is realized by regulating an opening degree of the throttle 25 so that the excess air ratio λ estimated by the λ-estimating function becomes equal to a desired value. The intake air amount to the combustion chamber 5, which is obtained by the λ-estimating function, may be directly obtained from an output of an airflow mater (not shown) provided inside the intake manifold 7.

Figure 3:
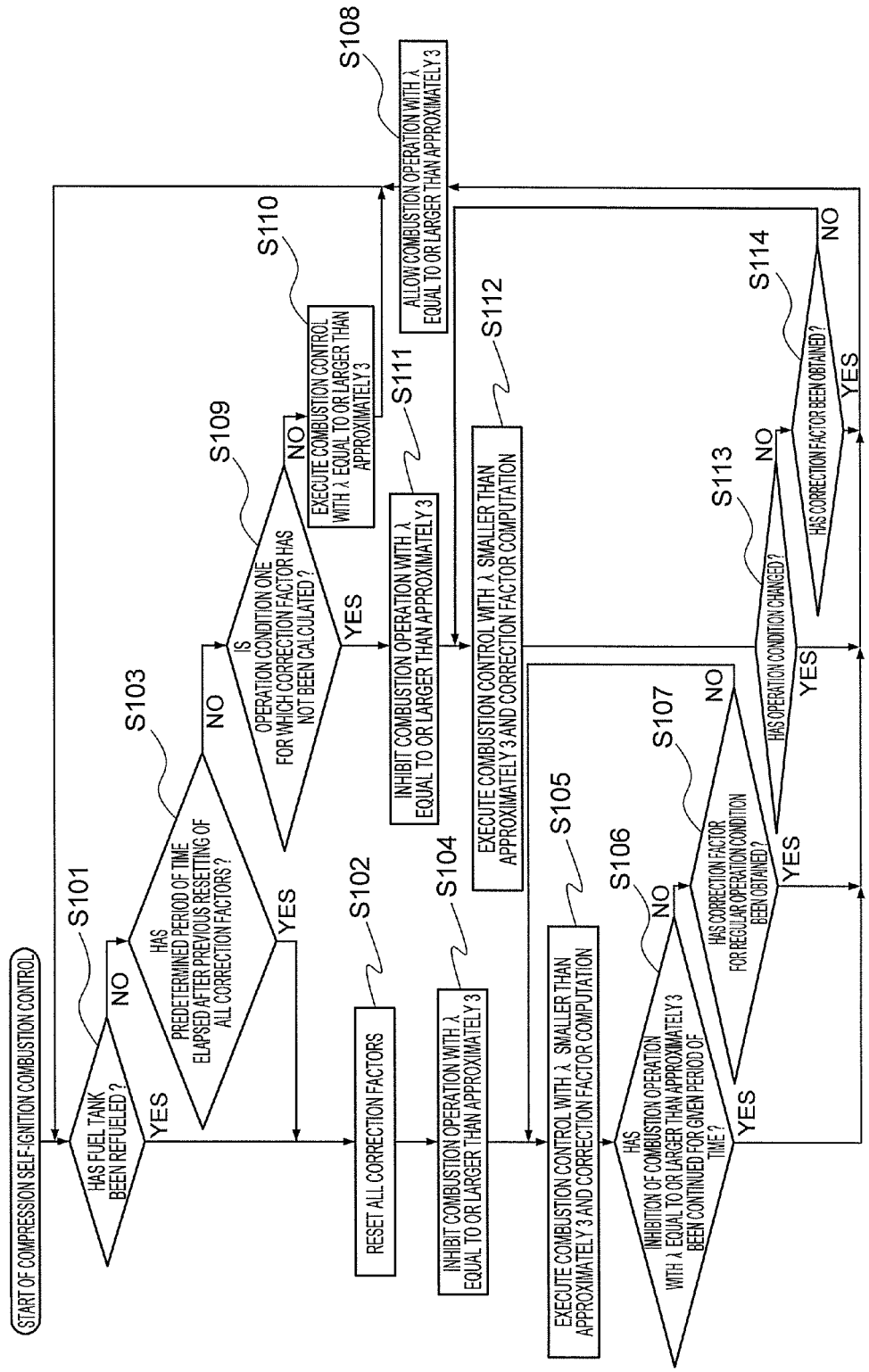
FIG. 3 is a flowchart illustrating control for performing switching between a plurality of operation conditions with different excess air ratios in the homogeneous charge compression ignition engine according to the first embodiment of the present invention.
Figure 4:
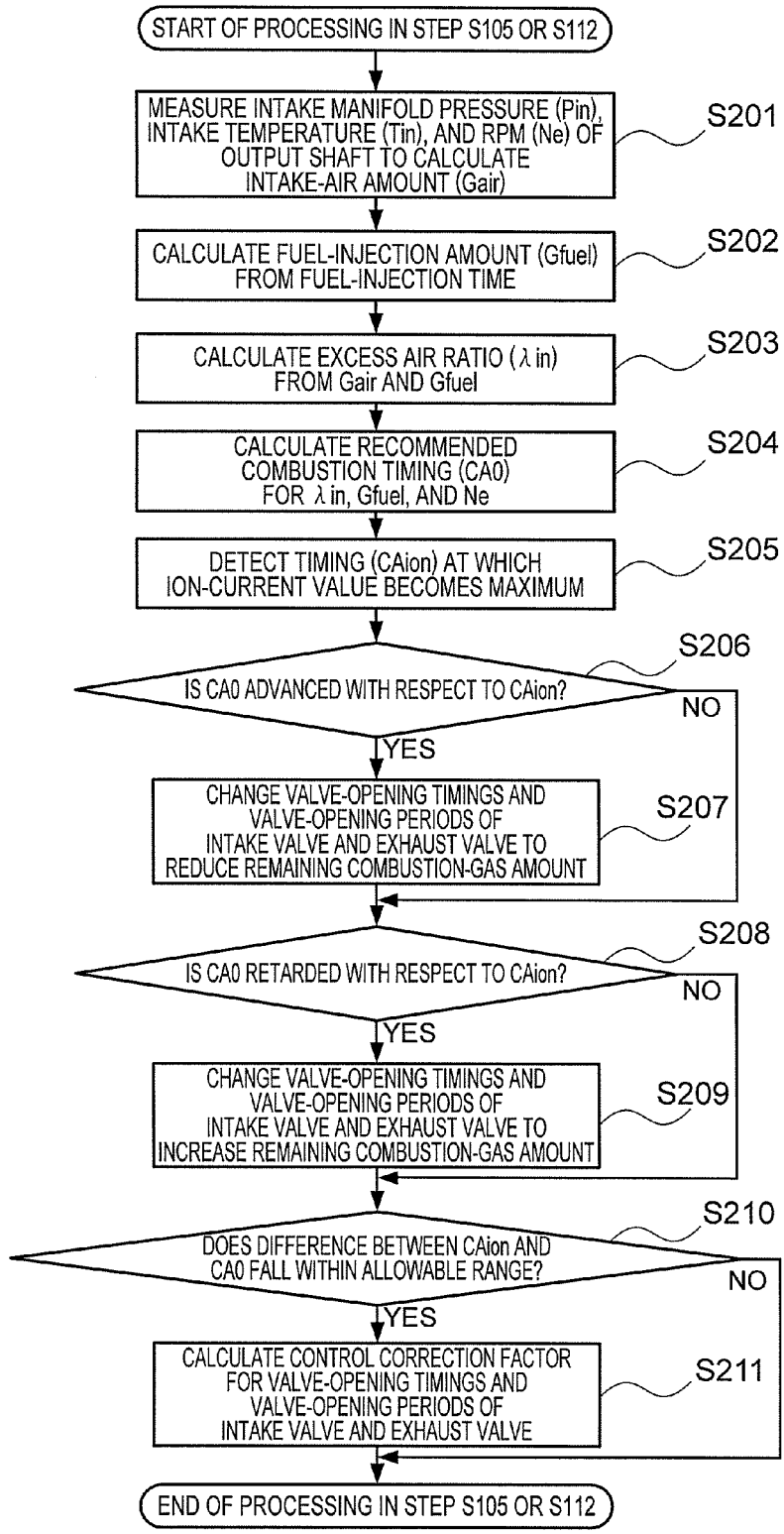
FIG. 4 is a flowchart illustrating control for computing a correction factor in a combustion operation at the excess air ratio smaller than approximately 3 in the homogeneous charge compression ignition engine according to the first embodiment of the present invention.
Figure 5:
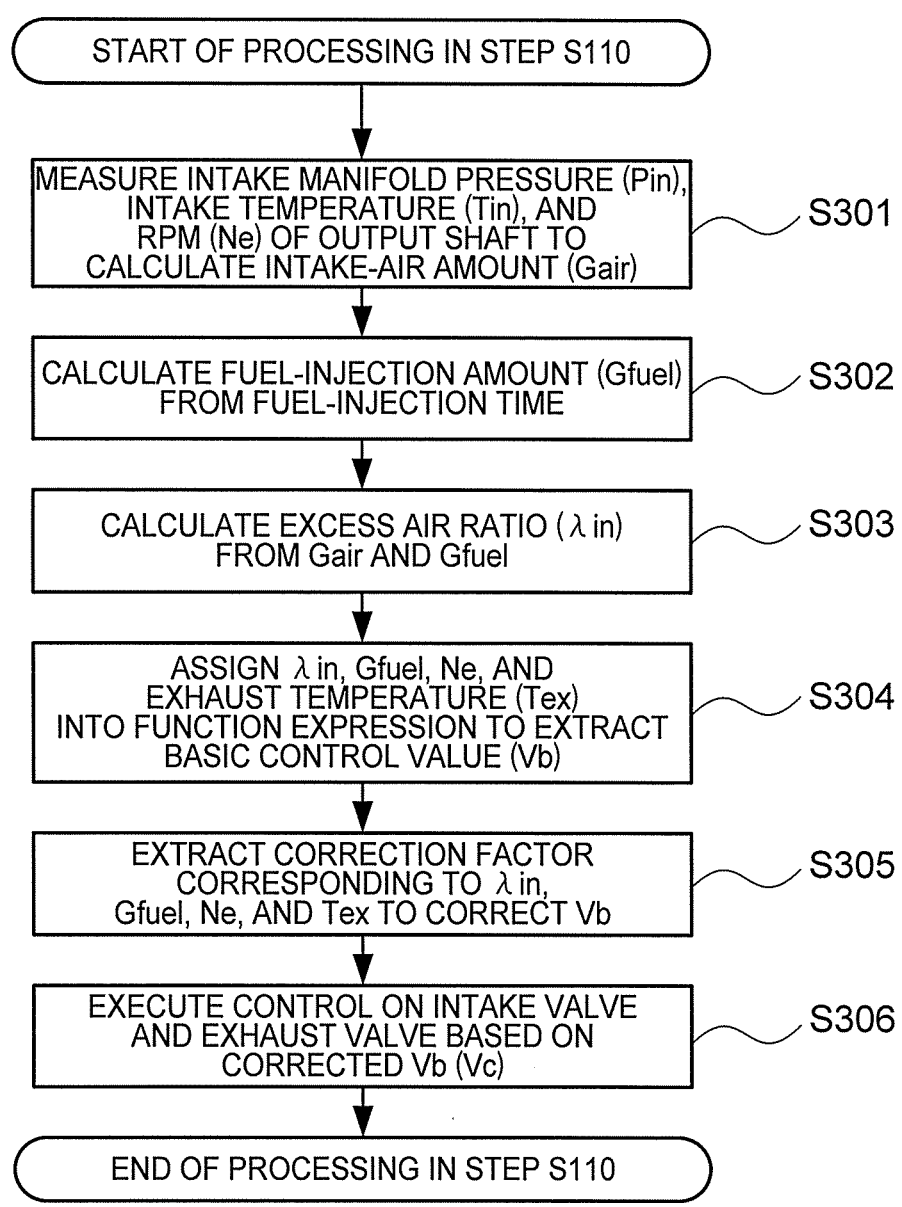
FIG. 5 is a flowchart illustrating control on an intake valve and an exhaust valve in the case where the combustion operation at the excess air ratio equal to or larger than approximately 3 is allowed in the homogeneous charge compression ignition engine according to the first embodiment of the present invention.
Figure 6:
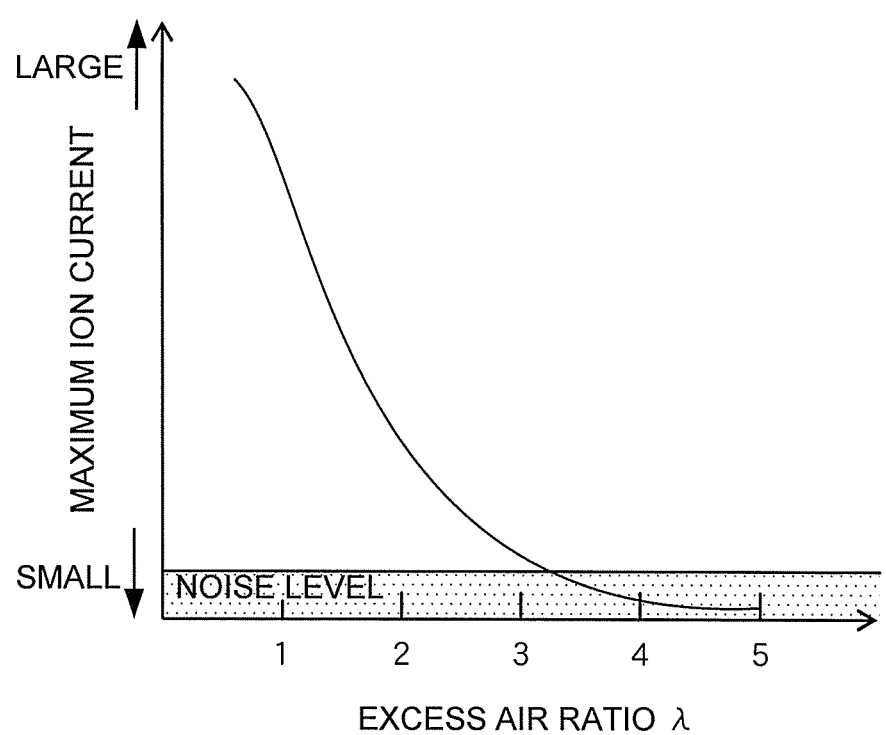
FIG. 6 is an explanatory view showing a change characteristic of a maximum ion current measured by the inventor(s) of the present invention with respect to the excess air ratio $\lambda$.

Subsequently, a flow of control on the homogeneous charge compression ignition engine described above is described referring to flowcharts of FIGS. 3 to 5. A main body which mainly performs the control in the flowcharts of FIGS. 3 to 5 is the engine control unit 10. FIG. 3 is a flowchart illustrating control for performing switching between a plurality of operation conditions with different excess air ratios λ in the homogeneous charge compression ignition engine according to the first embodiment of the present invention.

First, after compression self-ignition combustion control is started, it is first determined whether or not the fuel tank has been refueled (Step S101). Specifically, correction factor computation is required to be executed in the case where there is a possibility that the composition of elements of the fuel has changed. Therefore, whether or not the correction factor computation is required is first determined.

In Step S101, when it is determined that the fuel tank has been refueled (that is, Yes), all the correction factors are reset (Step S102). Then, the control processing proceeds to processing for computing a new correction factor. A method for determining whether or not the refueling has been performed is not specified. However, the refueling can be determined based on, for example, an increase in the amount of remaining fuel.

On the other hand, when it is determined in Step S101 that the fuel tank has not been refueled (that is, No), it is then determined whether or not a predetermined period of time has elapsed after the previous resetting of all the correction factors (Step S103). Here, there is a possibility that the composition of elements of the fuel has changed with elapse of time even when the refueling has not been performed. Therefore, whether or not the correction factor computation is required is determined.

In Step S103, when it is determined that the predetermined period of time has elapsed (that is, Yes), all the correction factors are reset (Step S102). Then, the control processing proceeds to processing for computing a new correction factor. Here, as the predetermined period of time, duration of a state in which the fuel in the fuel tank is stirred, for example, working time of the fuel pump, can be used. Then, whether or not the duration has exceeded, for example, six hours is determined.

The speed of change in the fuel composition differs depending on the fuel temperature. Therefore, processing for shortening a criterion value of the elapsed time may be added for the operation condition with the higher fuel temperature. Further, even in a state in which the fuel pump is not working and the fuel in the fuel tank is not stirred, the fuel composition changes though to a smaller extent as compared with the case where the fuel is stirred. Therefore, a value obtained by multiplying non-working time of the fuel pump by a coefficient of, for example, ⅕ or ¹/₁₀, may be added to the duration.

Subsequently, in the processing for computing the new correction factors, a combustion operation with the excess air ratio equal to or larger than approximately 3 is inhibited (Step S104). Specifically, the combustion state is required to be detected by using the ion current in the correction factor computation. Therefore, the combustion operation with the excess air ratio λ smaller than approximately 3, which allows a timing at which the ion current becomes maximum to be detected, is required. In this manner, the output of the internal combustion engine can be prevented from being destabilized due to frequent changes of the excess air ratio λ.

Next, the combustion control with the excess air ratio λ smaller than approximately 3 is executed by using the throttle 25 or the like while the correction factor is computed (Step S105). The details of the combustion control with the excess air ratio λ smaller than approximately 3 and the computation of the correction factors are described later referring to FIG. 4.

Subsequently, it is determined whether or not the inhibition of the combustion operation with the excess air ratio λ equal to or larger than approximately 3 has continued for a predetermined period of time (Step S106). This processing is performed for cancelling the inhibition of the combustion operation with the excess air ratio λ equal to or larger than approximately 3, which has been set in Step S104. Specifically, in order to operate the engine system with high efficiency, it is desired to shorten the operation time with the excess air ratio λ smaller than approximately 3 as much as possible.

When it is determined that the inhibition of the combustion operation with the excess air ratio λ equal to or larger than approximately 3 has continued for a predetermined period of time (that is, Yes) in Step S106, the control processing proceeds to processing for cancelling the inhibition of the combustion operation with the excess air ratio λ equal to or larger than approximately 3. The cancellation of the inhibition of the combustion operation with the excess air ratio λ equal to or larger than approximately 3 can be determined in Step S106 by comparing, for example, an integrated value of time periods, in which the combustion operation is being performed and the vehicle having the internal combustion engine mounted is running, and a preset reference value, for example, 30 minutes.

On the other hand, when it is determined that the inhibition of the combustion operation with the excess air ratio λ equal to or larger than approximately 3 has not continued for the predetermined period of time (that is, No) in Step S106, it is then determined whether or not a correction factor for the preset regular operation condition has been obtained (Step S107). This processing is performed for cancelling the inhibition at the time at which the correction factor of the regular operation condition is obtained so as to further shorten the inhibition time period.

In Step S107, when it is determined that the correction factor of the regular operation condition has not been obtained (that is, No), the processing of Step S105 and subsequent steps is repeated.

On the other hand, when it is determined in Step S107 that the correction factor of the regular operation condition has been obtained (that is, Yes), the control processing proceeds to processing for cancelling the inhibition of the combustion operation with the excess air ratio λ equal to or larger than approximately 3.

Next, in the processing for cancelling the inhibition of the combustion operation with the excess air ratio λ equal to or larger than approximately 3, the combustion operation with the excess air ratio λ equal to or larger than approximately 3 is allowed (Step S108). Then, the control processing returns to the processing in Step S101 again.

In the control processing performed in the steps described above, there are some cases where the operation condition, which does not allow the new correction factor to be obtained, is brought about. Therefore, under the operation condition under which the new correction factor is not obtained even in the case where the fuel tank has not been refueled (No in Step S101) and the predetermined period of time has not elapsed after the previous resetting of all the correction factors (No in Step S103), processing for executing the combustion operation with the excess air ratio λ smaller than approximately 3 so as to continue the correction factor computation is performed.

When it is determined that the predetermined period of time has not elapsed after the previous resetting of all the correction factors (that is, No) in Step S103, whether or not the operation condition is an operation condition for which the correction factor has not been calculated is determined (Step S109).

When it is determined that the operation condition is not the operation condition for which the correction factor has not been calculated (that is, No) in Step S109, the combustion control with the excess air ratio λ equal to or larger than approximately 3 is executed (Step S110). Then, the control processing returns to the processing in Step S101 again. The details of the combustion control with the excess air ratio λ equal to or larger than approximately 3 are described later referring to FIG. 5.

On the other hand, in Step S109, when it is determined that the operation condition is the operation condition for which the correction factor has not been calculated (that is, Yes), the combustion operation with the excess air ratio λ equal to or larger than approximately 3 is inhibited as in the case of Step S104 (Step S111). Then, as in the case of Step S105, the combustion control with the excess air ratio λ smaller than approximately 3 is executed by using the throttle 25 or the like, while the correction factor-computation is executed (Step S112).

Subsequently, whether or not the operation condition has changed is determined (Step S113). This processing is performed for cancelling the inhibition of the combustion operation with the excess air ratio λ equal to or larger than approximately 3, which has been set in Step S112. Specifically, although it is desired that the correction factor computation under an individual operation condition be continued until the correction factor is obtained, the processing is required to exit the control when the operation condition changes.

When it is determined in Step S113 that the operation condition has not changed (that is, No), whether or not the correction factor is obtained is determined (Step S114).

In Step S114, when it is determined that the correction factor has not been obtained (that is, No), the processing of Step S112 and subsequent steps is repeated.

On the other hand, when it is determined in Step S113 that the operation condition has changed (that is, Yes) or when it is determined in Step S114 that the correction factor has been obtained (that is, Yes), the control processing proceeds to processing for cancelling the inhibition of the combustion operation with the excess air ratio λ equal to or larger than approximately 3, where the combustion operation with the excess air ratio λ equal to or larger than approximately 3 is allowed (Step S108). Then, the control processing returns to the processing in Step S101 again.

Next, a flow of the processing for computing the correction factors in the combustion operation with the excess air ratio λ smaller than approximately 3, that is, a specific flow of the processing in Step S105 or Step S112 illustrated in FIG. 3 is described referring to a flowchart of FIG. 4.

First, when the combustion operation with the excess air ratio A smaller than approximately 3 is started, the engine control unit 10 obtains an intake-pipe pressure Pin from the intake-air pressure sensor 24, an intake temperature Tin from the intake-air temperature sensor 23, and an rpm Ne of the output-shaft crank 1 from the engine speed sensor 20 respectively as information so as to calculate an intake-air amount Gair from Pin, Tin, and Ne (Step S201).

The intake-air amount Gair changes depending on the intake-pipe pressure Pin, the intake temperature Tin, and the rpm Ne and, at the same time, is an amount determined by flow-path resistances of the intake manifold 7 and the intake valve 6, and a structure of the internal combustion engine such as the shape of the combustion chamber 5 and a stroke volume. Therefore, the intake-air amount Gair can be obtained by previously providing a function expression relating to the intake-pipe pressure Pin, the intake temperature Tin, and the rpm Ne to the engine control unit 10.

When multi-regression analysis is performed based on values obtained by varying the intake-pipe pressure Pin, the intake temperature Tin, and the rpm Ne and based on a measured value of the intake-air amount Gair, the following Expression (1) is obtained. In Expression (1), a1 represents a coefficient for multiplying the intake-pipe pressure value, a2 represents a coefficient for multiplying the intake-temperature value, and a3 represents a coefficient for multiplying the rpm value.

$$Gair = a1 \times Pin + a2 \times Tin + a3 \times Ne \quad (1)$$

Subsequently, the engine control unit 10 calculates a fuel injection amount Gfuel from the control information of the fuel injection, which is to be output to the injector drive control unit 11 (Step S202).

The fuel-injection amount under the condition where a fuel-supply pressure is constant is controlled by the valve-opening time period of the fuel injector 8. Therefore, as in the following Expression (2), a polynominal relating to a valve-opening control time Topen is previously provided to the engine control unit 10. Then, the valve-opening control time Topen corresponding to the control information of the fuel injection, which is output from the engine control unit 10 to the injector drive control unit 11, is assigned to the valve-opening control time Topen. In this manner, the fuel-injection amount can be calculated.

$$Gfuel = \Sigma bi \times Topen^i \quad (2)$$

In Expression (2), i represents a degree, and Gfuel is obtained as a value obtained by integrating a value, which is obtained by multiplying a coefficient b previously obtained for each degree by the degree power of the valve-opening control time Topen, by the number of degrees which is generally up to about 5.

Next, the engine control unit 10 calculates an excess air ratio λ in from the intake-air amount Gair and the fuel-injection amount Gfuel (Step S203).

If the fuel is general gasoline, there is provided a minimum necessary amount of oxygen, which is required for an oxidation reaction of gasoline in the case where air is 1.47 when gasoline is 1 as a mass ratio. Here, the excess air ratio λin is a value indicating how many times as large as 14.7 air is present when gasoline is 1, and therefore can be obtained by assigning weight values of the intake-air amount Gair and the fuel-injection amount Gfuel into the following Expression (3).

$$\lambda in = (Gair/Gfuel)/14.7 \quad (3)$$

At this time, the excess air ratio λin may be an arbitrary value of about 2.0. When a data map for defining the recommended combustion timing to be described below is used, it is desired to regulate the throttle 25 so that, for example, the excess air ratio λ becomes always 2.5 to reduce the amount of memory used to retain the data.

Subsequently, by assigning the excess air ratio λ in, the fuel-injection amount Gfuel, and the rpm Ne as variables to a previously obtained function expression expressed by the following Expression (4), the engine control unit 10 calculates a recommended combustion timing CA0 (Step S204).

$$CA0 = c1 \times \lambda in + c2 \times Gfuel + c3 \times Ne \quad (4)$$

Similarly to Expression (1), Expression (4) is a function expression obtained by performing the multi-regression analysis or the like based on characteristic values specific to the internal combustion engine, and c1 represents a coefficient for multiplying the excess air ratio value, c2 represents a coefficient for multiplying the fuel-injection amount value, and c3 represents a coefficient for multiplying the rpm value.

Moreover, when the function expression is not used, CA0 may be obtained by a method for extracting the recommended combustion timing value corresponding to the parameter values from the previously created data map of the recommended combustion timing, which has the excess air ratio λ in, the fuel-injection amount Gfuel, and the rpm Ne as condition parameters.

Next, the engine control unit 10 detects a timing CAion at which the ion current becomes maximum (Step S205). Specifically, the ion current is continuously measured by the ion-current circuit 19 so as to extract an angle of rotation of the output-shaft crank 1, at which the ion current becomes maximum, which appears in the vicinity of a compression TDC. Processing for extracting the angle of rotation of the output-shaft crank 1 is executed by the ion-current circuit 19 or the injector drive control unit 11.

Subsequently, the engine control unit 10 determines whether or not the recommended combustion timing CA0 is advanced with respect to the timing CAion at which the ion current becomes maximum (Step S206).

In Step S206, when it is determined that the recommended combustion timing CA0 is advanced (that is, Yes), control for setting the timing CAion, at which the ion current becomes maximum, closer to the recommended combustion timing CA0 is executed (Step S207).

On the other hand, when it is determined in Step S206 that the recommended combustion timing CA0 is not advanced (that is, No), the control processing directly proceeds to Step S208, which is to be described below.

Specifically, when the recommended combustion timing CA0 is advanced, it is necessary to set the temperature of the mixture of air, the fuel, and the remaining combustion gas to be lower than a current temperature of the mixture. Therefore, control for reducing the amount of remaining combustion gas is performed. More specifically, for example, by retarding a timing of closing the exhaust valve 12, the amount of the combustion gas to be exhausted to the exterior of the internal combustion engine through the exhaust manifold 21 increases. Therefore, the amount of combustion gas remaining in the combustion chamber 5 can be reduced.

Next, the engine control unit 10 determines whether or not the recommended combustion timing CA0 is retarded with respect to the timing CAion at which the ion current becomes maximum (Step S208).

When it is determined in Step S208 that the recommended combustion timing CA0 is retarded (that is, Yes), the control for setting the timing CAion, at which the ion current becomes maximum, closer to the recommended combustion timing CA0 is performed (Step S209).

On the other hand, when it is determined in Step S208 that the recommended combustion timing CA0 is not retarded (that is, No), the control processing directly proceeds to Step S210, which is to be described later.

Specifically, when the recommended combustion timing CA0 is retarded, it is necessary to set the temperature of the mixture of air, the fuel, and the remaining combustion gas to be higher than the current temperature of the mixture. Therefore, control for increasing the amount of remaining combustion gas is performed. More specifically, for example, by advancing the timing of closing the exhaust valve 12, the amount of the combustion gas to be exhausted to the exterior of the internal combustion engine through the exhaust manifold 21 reduces. Therefore, the amount of combustion gas remaining in the combustion chamber 5 can be increased.

Subsequently, the engine control unit 10 determines whether or not a difference between the timing CAion at which the ion current becomes maximum and the recommended combustion timing CA0 falls within an allowable range, for example, the difference is equal to or smaller than 2 degrees in angle of rotation of the output-shaft crank 1 (Step S210). By processing in Step S210 and subsequent Step S211, the correction factor in the operation state is determined.

When it is determined in Step S210 that the difference between the timing CAion at which the ion current becomes maximum and the recommended combustion timing CA0 falls within the allowable range (that is, Yes), the engine control unit 10 calculates the correction factor for the valve-opening timings and the valve-opening periods of the intake valve 6 and the exhaust valve 12 (Step S211), and the processing illustrated in FIG. 4 is terminated. Then, the control processing proceeds to the next processing illustrated in FIG. 3.

The correction factor is a deviation or a rate of the deviation of the valve-opening timing value and the valve-opening time period value of each of the valves, which are currently actually set, with respect to the valve-opening timing value and the valve-opening time period value of each of the valves under the current operation condition, which are extracted from the previously prepared valve-driving basic data. For example, when the current valve-opening time period of the exhaust valve 12 is larger by 5% than the valve-opening time period of the exhaust valve 12, which is extracted from the valve-driving basic data, the correction factor is set to 1.05 and is then retained in the memory included in the engine control unit 10.

The valve-driving basic data is required to be previously created at the time of design of the internal combustion engine or the like for each of a set of the valve-opening timing and the valve-opening time period of the intake valve 6 and a set of the valve-opening timing and the valve-opening time period of the exhaust valve 12. Specifically, when the valve-driving basic data is defined by a function expression having the excess air ratio λ in, the fuel-injection amount Gfuel, the rpm Ne, and an exhaust temperature Tex as variables, for example, as expressed by the following Expression (5), a basic control value Vb can be obtained by assigning execution values to the respective variables.

$$Vb = d1 \times \lambda in + d2 \times Q1 + d3 \times Ne + d4 \times Tex \quad (5)$$

Similarly to Expressions (1) and (4), Expression (5) is a function expression obtained by performing the multi-regression analysis based on the characteristic values specific to the internal combustion engine. In Expression (5), d1 represents a coefficient for multiplying the excess air ratio value, d2 represents a coefficient for multiplying the fuel injection amount value, d3 represents a coefficient for multiplying the rpm value, and d4 represents a coefficient for multiplying the exhaust temperature value.

When the function expression is not used, the basic control value Vb corresponding to the parameter values may be extracted from the previously created map of the valve-driving basic data having the excess air ratio λ in, the fuel-injection amount Gfuel, the rpm Ne, and the exhaust temperature Tex as condition parameters.

On the other hand, when it is determined in Step S210 that the difference between the timing CAion at which the ion current becomes maximum and the recommended combustion timing CA0 does not fall within the allowable range (that is, No), the processing illustrated in FIG. 4 is terminated in this step. Then, the control processing proceeds to the next processing illustrated in FIG. 3.

Next, a flow of the processing for controlling the intake valve 6 and the exhaust valve 12 in the case where the combustion operation with the excess air ratio λ equal to or larger than approximately 3 is allowed, that is, a specific flow of the processing in Step S110 illustrated in FIG. 3 is described referring to a flowchart of FIG. 5.

First, when the combustion operation with the excess air ratio A equal to or larger than approximately 3 is started, the engine control unit 10 obtains an intake-pipe pressure Pin from the intake-air pressure sensor 24, an intake temperature Tin from the intake-air temperature sensor 23, and an rpm Ne of the output-shaft crank 1 from the engine speed sensor 20 respectively as information so as to assign Pin, Tin, and Ne to Expression (1) described above and calculate an intake-air amount Gair (Step S301).

Subsequently, the engine control unit 10 assigns the valve-operating control time Topen corresponding to the control information of the fuel injection, which is to be output to the injector drive control unit 11, to Expression (2) described above so as to calculate a fuel injection amount Gfuel (Step S302).

Next, the engine control unit 10 calculates an excess air ratio λ in by assigning the intake-air amount Gair and the fuel-injection amount Gfuel to Expression (3) described above (Step S303).

Subsequently, the engine control unit 10 assigns respective execution values of the excess air ratio λ in, the fuel-injection amount Gfuel, the rpm Ne, and the exhaust temperature Tex to the function expression expressed by Expression (5) described above to obtain the basic control value Vb (Step S304). In this case, the basic control value Vb corresponding to the parameter values maybe extracted from the map of the valve-driving basic data having the excess air ratio λin, the fuel-injection amount Gfuel, the rpm Ne, and the exhaust temperature Tex as condition parameters.

Next, the engine control unit 10 extracts the correction factor corresponding to the respective execution values of the excess air ratio λin, the fuel-injection amount Gfuel, the rpm Ne, and the exhaust temperature Tex to correct the basic control value Vb (Step S305).

Subsequently, the engine control unit 10 executes control for changing at least one of the valve-opening timings and the valve-opening periods of the intake valve 6 and the exhaust valve 12 based on the corrected basic control value Vb (Vc) (Step S306), and the processing illustrated in FIG. 5 is terminated. Then, the control processing proceeds to the next processing illustrated in FIG. 3.

There are various methods for correcting the basic control value Vb. For example, when the correction factor is 1.05, specifically, under the conditions where a basic operation is required to be corrected by 5%, the valve-opening timings and the valve-opening periods of the intake valve 6 and the exhaust valve 12 are controlled by using a value Vc obtained by multiplying the basic control value Vb by 1.05 corresponding to the correction factor. An additional correction value proportional to the specific operation parameter value such as the excess air ratio λ may be defined as necessary so as to perform processing of additionally adding the additional correction value to Vc or additionally multiplying Vc by the additional correction value.

When the execution value of the excess air ratio λ in calculated in Step S303 is equal to or smaller than a value which allows the detection of the timing at which the ion current becomes maximum, the processing in Steps S204 to S211 may be performed in place of the processing in Steps S304 to S306 described above.

As described above, according to the first embodiment, the correction factor computing section performs the combustion control with the excess air ratio smaller than approximately 3 when the predetermined conditions are satisfied and also computes the correction factor for correcting the deviation between the execution values of the valve-opening timings and the valve-opening periods of the intake valve and the exhaust valve and the basic valve-opening timings and the basic valve-opening periods of the intake valve and the exhaust valve, which are previously determined for each of the operation conditions, based on the timing at which the ion current becomes maximum which is detected in the combustion-timing detection section, in the combustion control with the excess air ratio smaller than approximately 3.

Therefore, during the combustion operation with the excess air ratio equal to or larger than approximately 3, at least one of the valve-opening timings and the valve-opening periods of the intake valve and the exhaust valve is controlled by using the correction factor. As a result, even under the operation condition in the super-excess air state in which the combustion control based on the ion-current measurement, which can be realized by an inexpensive device, cannot be implemented, the compression self-ignition combustion operation corresponding to a change in the combustion state due to a change in composition of elements of the fuel is enabled. Thus, a highly efficient and stable combustion state can be obtained over a wide range of load condition.

Specifically, the correction factor for the internal combustion engine control, which can also be used under the super-excess air ratio condition under which the ion-current information is not obtained although high fuel efficiency is obtained, is extracted based on the ion-current information obtained by the inexpensive device. Therefore, the internal combustion engine, which allows a stable and highly efficient combustion operation to be performed by the inexpensive device, can be obtained.

Moreover, in the case where the fuel tank is refueled, the processing for extracting the correction factor for the internal combustion engine control is performed. Therefore, the internal combustion engine, which allows a stable and highly efficient combustion operation always corresponding to a change in the combustion characteristics of the compression self-ignition combustion which occurs with a change in composition of elements of the fuel, can be obtained.

Further, in the case where there is a possibility that the composition of elements of the fuel has changed with elapse of time, the processing for extracting the correction factor for the internal combustion engine control is performed. Therefore, the internal combustion engine, which allows a stable and highly efficient combustion operation always corresponding to a change in the combustion characteristics of the compression self-ignition combustion which occurs with a change in composition of elements of the fuel, can be obtained.

Further, the time period for extracting the correction factor for the internal combustion engine control is maintained for a given period of time. Therefore, there is no need of frequent switching between the operation with the high excess air ratio under the operation condition under which the correction factor for the internal combustion engine control has already been obtained and the operation with the low excess air ratio under the operation condition under which the correction factor for the internal combustion engine control has not been obtained yet. As a result, the internal combustion engine, which allows a stable combustion operation, can be obtained.

Further, when the correction factors under the conditions for regular operation are the same, the operation with the high excess air ratio under the operation condition is allowed. Therefore, the internal combustion engine, which allows a stable and highly efficient combustion engine, can be obtained.

Further, under the operation condition under which the correction factor is not obtained even when the time period for extracting the correction factor for the internal combustion engine control is maintained for the given period of time, the operation condition under which the correction factor is to be extracted is maintained until the correction factor is obtained, and the operation with the high excess air ratio is allowed after the correction factor is obtained. Therefore, the internal combustion engine, which allows a stable combustion operation to be performed, can be obtained.

Further, the correction factor for the internal combustion engine, which is obtained based on the ion-current information in the operation with the low excess air ratio, is applied to the control for the internal combustion engine in the operation with the high excess air ratio, in which the ion-current information is not obtained. Therefore, the internal combustion engine, which allows a stable and highly efficient combustion operation to be performed by the inexpensive device, can be obtained.

What is claimed is:
1. A controller for a homogeneous charge compression ignition engine performing a combustion operation of self-igniting, by a compression of a piston, a high-excess air ratio mixture, which is a mixture formed in a combustion chamber and having an excess air ratio of 3 or larger, which is a mixture ratio of air and fuel of three times or more as large as a stoichiometric mixture ratio, the controller comprising:
   an ion-current detection section configured to detect ions generated by combustion in the combustion chamber as an ion current;
   a combustion-timing detection section configured to detect a timing at which the ion current becomes maximum; and
   a correction factor computing section configured to, when a predetermined condition is satisfied, execute combustion control with the excess air ratio smaller than approximately 3 and compute a correction factor for correcting deviations between execution values of valve-opening timings and valve-opening periods of an intake valve and an exhaust valve and basic valve-opening timings and basic valve-opening periods of the intake valve and the exhaust valve which are previously determined for each operation condition, based on the timing at which the ion current detected by the combustion-timing detection section becomes maximum, in the combustion control with the excess air ratio smaller than approximately 3.

2. The controller for the homogeneous charge compression ignition engine according to claim 1, wherein the predetermined condition is a currently performed combustion operation for a given period of time immediately after a fuel tank of a vehicle is refueled.

3. The controller for the homogeneous charge compression ignition engine according to claim 1, wherein the predetermined condition is a currently performed combustion operation for a given period of time immediately after elapse of a given time after a previous computation of the correction factor by the correction factor computing section.

4. The controller for the homogeneous charge compression ignition engine according to claim 2, wherein the predetermined condition is a currently performed combustion operation for a given period of time immediately after elapse of a given time after a previous computation of the correction factor by the correction factor computing section.

5. The controller for the homogeneous charge compression ignition engine according to claim 1, wherein the correction factor computing section is further configured to inhibit a combustion operation with the excess air ratio equal to or larger than approximately 3 when the predetermined condition is satisfied.

6. The controller for the homogeneous charge compression ignition engine according to claim 2, wherein the correction factor computing section is further configured to inhibit a combustion operation with the excess air ratio equal to or larger than approximately 3 when the predetermined condition is satisfied.

7. The controller for the homogeneous charge compression ignition engine according to claim 5, wherein the correction factor computing section is further configured to cancel the inhibition of the combustion operation with the excess air ratio equal to or larger than approximately 3 regardless of whether or not the given period of time has elapsed when it is determined that the correction factor for a regular operation condition is obtained during execution of control for inhibiting the combustion operation with the excess air ratio equal to or larger than approximately 3.

8. The controller for the homogeneous charge compression ignition engine according to claim 6, wherein the correction factor computing section is further configured to cancel the inhibition of the combustion operation with the excess air ratio equal to or larger than approximately 3 regardless of whether or not the given period of time has elapsed when it is determined that the correction factor for a regular operation condition is obtained during execution of control for inhibiting the combustion operation with the excess air ratio equal to or larger than approximately 3.

9. The controller for the homogeneous charge compression ignition engine according to claim 5, wherein the correction factor computing section is further configured to continue the inhibition of the combustion operation with the excess air ratio equal to or larger than approximately 3 only for the operation condition for which the correction factor is not obtained in a case where it is determined that the correction factor is not obtained for the operation condition after the control for inhibiting the combustion operation with the excess air ratio equal to or larger than approximately 3 is executed for the given period of time, and the correction factor computing section is further configured to cancel the inhibition of the combustion operation with the excess air ratio equal to or larger than approximately 3 at a time when the correction factor is obtained for the operation condition.

10. The controller for the homogeneous charge compression ignition engine according to claim 6, wherein the correction factor computing section is further configured to continue the inhibition of the combustion operation with the excess air ratio equal to or larger than approximately 3 only for the operation condition for which the correction factor is not obtained in a case where it is determined that the correction factor is not obtained for the operation condition after the control for inhibiting the combustion operation with the excess air ratio equal to or larger than approximately 3 is executed for the given period of time, and the correction factor computing section is further configured to cancel the inhibition of the combustion operation with the excess air ratio equal to or larger than approximately 3 at a time when the correction factor is obtained for the operation condition.

11. The controller for the homogeneous charge compression ignition engine according to claim 7, wherein the correction factor computing section is further configured to continue the inhibition of the combustion operation with the excess air ratio equal to or larger than approximately 3 only for the operation condition for which the correction factor is not obtained in a case where it is determined that the correction factor is not obtained for the operation condition after the control for inhibiting the combustion operation with the excess air ratio equal to or larger than approximately 3 is executed for the given period of time, and the correction factor computing section is further configured to cancel the inhibition of the combustion operation with the excess air ratio equal to or larger than approximately 3 at a time when the correction factor is obtained for the operation condition.

12. The controller for the homogeneous charge compression ignition engine according to claim 8, wherein the correction factor computing section is further configured to continue the inhibition of the combustion operation with the excess air ratio equal to or larger than approximately 3 only for the operation condition for which the correction factor is not obtained in a case where it is determined that the correction factor is not obtained for the operation condition after the control for inhibiting the combustion operation with the excess air ratio equal to or larger than approximately 3 is executed for the given period of time, and the correction factor computing section is further configured to cancel the inhibition of the combustion operation with the excess air ratio equal to or larger than approximately 3 at a time when the correction factor is obtained for the operation condition.

13. The controller for the homogeneous charge compression ignition engine according to claim 1, further comprising a valve-driving control section configured to control at least one of the valve-opening timings and the valve-opening periods of the intake valve and the exhaust valve, wherein:
the valve-driving control section is further configured to control the valve-opening timings and the valve-opening periods of the intake valve and the exhaust valve based on the timing at which the ion current detected by the combustion-timing detection section becomes maximum so that the timing becomes synchronous with a proper timing previously determined for the each operation condition, in the combustion control with the excess air ratio smaller than approximately 3; and
the valve-driving control section is further configured to control the valve-opening timings and the valve-opening periods of the intake valve and the exhaust valve after correction processing for the basic valve-opening timings and the basic valve-opening periods of the intake valve and the exhaust valve, which are previously determined for the each operation condition, is executed by using the correction factor, in the combustion control with the excess air ratio equal to or larger than approximately 3.

14. The controller for the homogeneous charge compression ignition engine according to claim 2, further comprising a valve-driving control section configured to control at least one of the valve-opening timings and the valve-opening periods of the intake valve and the exhaust valve, wherein:
- the valve-driving control section is further configured to control the valve-opening timings and the valve-opening periods of the intake valve and the exhaust valve based on the timing at which the ion current detected by the combustion-timing detection section becomes maximum so that the timing becomes synchronous with a proper timing previously determined for the each operation condition, in the combustion control with the excess air ratio smaller than approximately 3; and
- the valve-driving control section is further configured to control the valve-opening timings and the valve-opening periods of the intake valve and the exhaust valve after correction processing for the basic valve-opening timings and the basic valve-opening periods of the intake valve and the exhaust valve, which are previously determined for the each operation condition, is executed by using the correction factor, in the combustion control with the excess air ratio equal to or larger than approximately 3.

\* \* \* \* \*